United States Patent
Rao (10) Patent No.: US 7,139,388 B2
(45) Date of Patent: Nov. 21, 2006

(54) METHODS, SYSTEMS, AND COMPUTER PROGRAM PRODUCTS FOR POST-GLOBAL-TITLE-TRANSLATION (GTT) LOAD SHARING

(75) Inventor: Raghavendra Gopala Rao, Cary, NC (US)

(73) Assignee: Tekelec, Morrisville, NC (US)

( * ) Notice: Subject to any disclaimer, the term of this patent is extended or adjusted under 35 U.S.C. 154(b) by 0 days.

(21) Appl. No.: 11/225,370

(22) Filed: Sep. 13, 2005

(65) Prior Publication Data
US 2006/0056615 A1    Mar. 16, 2006

Related U.S. Application Data (60) Provisional application No. 60/609,487, filed on Sep. 13, 2004.

(51) Int. Cl.
*H04M 7/00* (2006.01)
(52) U.S. Cl. .............. 379/229; 379/88.17; 379/221.08; 379/221.12; 379/230
(58) Field of Classification Search ................ 370/466, 370/467; 379/88.17, 221.08, 221.12, 229, 379/230
See application file for complete search history.

(56) References Cited

U.S. PATENT DOCUMENTS

| | | | |
|---|---|---|---|
| 6,175,574 B1 * | 1/2001 | Lewis | 370/522 |
| 6,324,279 B1 * | 11/2001 | Kalmanek et al. | 379/229 |
| 6,377,674 B1 * | 4/2002 | Chong et al. | 379/230 |
| 6,683,881 B1 * | 1/2004 | Mijares et al. | 370/401 |
| 6,785,378 B1 * | 8/2004 | Mar | 379/229 |
| 2004/0015964 A1 | 1/2004 | McCann et al. | 717/178 |
| 2006/0039546 A1 | 2/2006 | Davidson et al. | |

\* cited by examiner

*Primary Examiner*—Quynh H. Nguyen
(74) *Attorney, Agent, or Firm*—Jenkins, Wilson, Taylor & Hunt, P.A.

(57) ABSTRACT

Methods, systems, and computer program products for post global title translation load sharing include receiving a plurality of signaling messages sent route on global title. Global title translation is performed for the signaling messages to result in multiple global title destinations for at least some of the signaling messages. One of the destination addresses is selected using the parameter in the signaling messages and the load sharing algorithm so that messages that are part of the same transaction are sent to the same destination address and messages related to different transactions are load shared among different destination addresses. Sequencing may also be performed so that sequenced messages are transmitted in the same order that they are received.

59 Claims, 4 Drawing Sheets

METHODS, SYSTEMS, AND COMPUTER PROGRAM PRODUCTS FOR POST-GLOBAL-TITLE-TRANSLATION (GTT) LOAD SHARING

RELATED APPLICATIONS

This application claims the benefit of U.S. Provisional Patent Application Ser. No. 60/609,487, filed Sep. 13, 2004; the disclosure of which is incorporated herein by reference in its entirety.

TECHNICAL FIELD

The subject matter described herein relates to methods, systems, and computer program products for load sharing among signaling points. More particularly, the present invention relates to methods, systems, and computer program products for performing post-GTT load sharing and preserving sequencing of sequenced messages.

BACKGROUND ART

Figure 1:
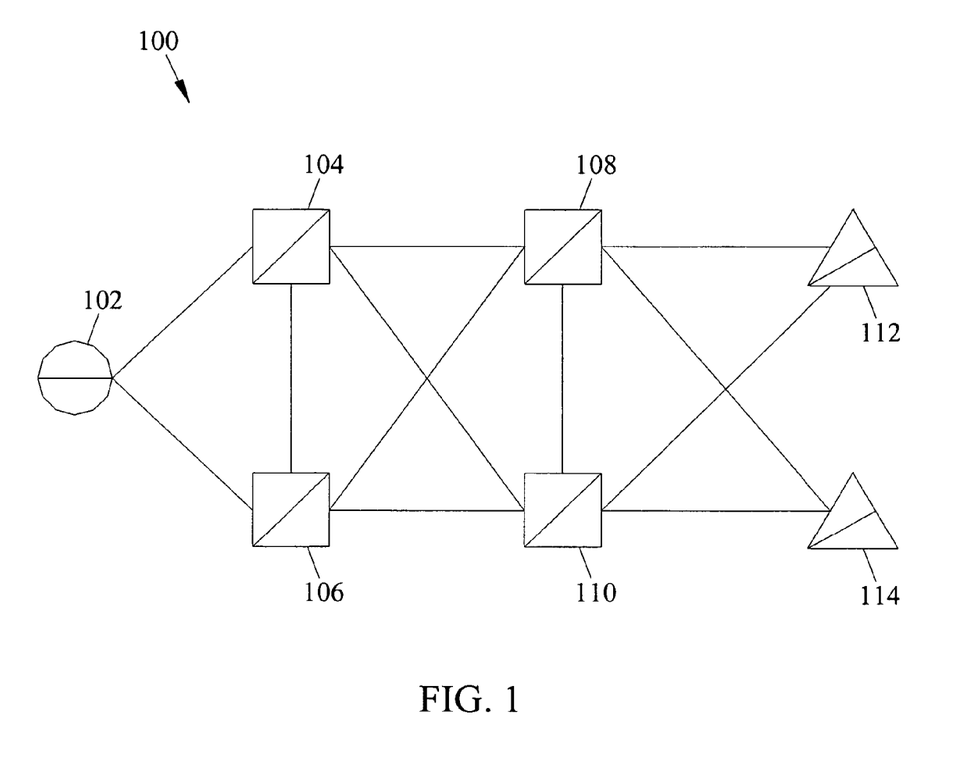
FIG. 1 is a network diagram depicting interconnected signaling system 7 (SS7) signaling points.

In telecommunications networks, such as SS7 networks, signaling points are often deployed in pairs to provide a desired level of network reliability. FIG. 1 is a simplified network diagram depicting interconnected signaling system 7 (SS7) signaling points. In FIG. 1, a service switching point (SSP) 102 is connected to signal transfer point (STP) 104 and STP 106, providing two paths for routing messages originating from SSP 102. STP 104 and STP 106 are deployed as paired nodes and provide redundant network services. STP 108 and STP 110 are also deployed as paired nodes and provide redundant network services as well. Messages sent to STP 104 may be routed to either STP 108 or STP 110 to obtain the desired service. Likewise, STP 106 may route messages to STP 108 or STP 110. Thus, a message signaling unit (MSU) originating from SSP 102 and destined for service control point (SCP) 112 may be routed in the first instance through either STP 104 or STP 106 and in the second instance through either STP 108 or STP 110 before reaching SCP 112. Likewise, MSUs intended for SCP 114 may be routed through either STP 108 or STP 110. Thus, in the event of a failure of either an STP or a signaling link between STPs, messages may still be routed through the network by following a redundant signaling path.

In some implementations, STPs are configured to provide global title translation (GTT) service for signaling messages that are sent route-on-global-title. Global title translation refers to a process where the global title address is translated into the point code and subsystem number of an intermediate destination when immediate global title translation is being performed and to the point code and subsystem number of a final destination when final GTT is being performed. In the network architecture illustrated in FIG. 1, STPs 104 and 106 may perform intermediate global title translation for messages destined for SCPs 112 and 114. Similarly, STPs 108 and 110 may perform final global title translation for messages destined for SCPs 112 and 114.

In order to balance the load on the signaling links or nodes in a SS7 network, it may be desirable to load share messages after performing global title translation. For example, it may be desirable for STP 104 to perform intermediate global title translation such that messages are alternatingly sent to STPs 108 and 110. Similarly, it may be desirable for STP 108 to perform final global title translation such that queries are alternatingly sent to SCPs 112 and 114.

One problem with such post-GTT load sharing occurs when messages are required to be delivered in sequence to the same destination. For example, a typical transaction capabilities application part (TCAP) transaction may include a begin transaction message sent from the originating switch to the database, a continue message sent from the database to the originating switch, a second continue message sent from the originating switch to the database, and a TCN message sent from the database to the originating switch. In order for such a transaction to be processed correctly by the database, the database that receives the begin transaction message must be the same database that receives the subsequent continue messages. In addition, the database must receive the begin transaction message before receiving the continue messages. Using conventional global title translation where the global title address translates into the same point code and subsystem number, such ordering is guaranteed. However, if load sharing is utilized, messages that are part of the same transaction may be delivered to different databases or the messages may be delivered to the same database out of order. Because such misordering and misdelivery can cause errors at the application level, conventional global title translation has not utilized a load sharing algorithm in networks where transactions require sequencing or multiple messages.

Accordingly, in light of the difficulties associated with conventional global title translation, there exists a need for methods, systems, and computer program products for post-GTT load sharing.

SUMMARY

In accordance with the subject matter described herein, methods, systems, and computer program products for performing post-GTT load sharing at a node in a communication network are disclosed. One exemplary method includes receiving a message signaling unit (MSU) carrying a signaling connection control part (SCCP) message. Global title translation is performed to determine at least a first and a second destination address for the MSU. A predetermined parameter in the MSU is used to select among the global title destination addresses using a load sharing algorithm. In one implementation, the predetermined parameter may be TCAP transaction identifier and the load sharing algorithm may be a modulus function of the transaction identifier. The result of computing the modulus of the transaction identifier by a constant value, such as 2, ensures that messages having the same transaction identifier will translate to the same global title translation destination. Messages with different transaction identifiers may result in selection of different post-GTT destinations, depending on the output of the modulus function. As a result, load sharing is not performed for messages that are part of the same transaction. Load sharing is performed however for messages that are part of different transactions.

Sequencing of messages may be performed by re-ordering signaling messages that are mis-ordered due to processing delays within a routing node. Exemplary methods for re-ordering signaling messages will be described in detail below.

The subject matter described herein can be implemented using a computer program product comprising computer-executable instructions embodied in a computer-readable medium. Exemplary computer-readable media suitable for implementing the subject matter described herein include chip memory devices, disk memory devices, programmable logic devices, application specific integrated circuits, and downloadable electrical signals. In addition, a computer-readable medium that implements the subject matter described herein may be located on a single device or computing platform or may be distributed across multiple computing devices or computing platforms.

Accordingly, it is an object of the subject matter described herein to provide methods, systems, and computer program products for post-GTT load sharing.

It is another object of the subject matter described herein to provide methods and systems for ensuring that sequenced messages are transmitted from a routing node in the order in which they were received by the routing node.

Some of the objects of the subject matter described herein having been stated hereinabove, and which are addressed in whole or in part by the subject matter described herein, other objects will become evident as the description proceeds when taken in connection with the accompanying drawings as best described hereinbelow.

DETAILED DESCRIPTION

Figure 2:
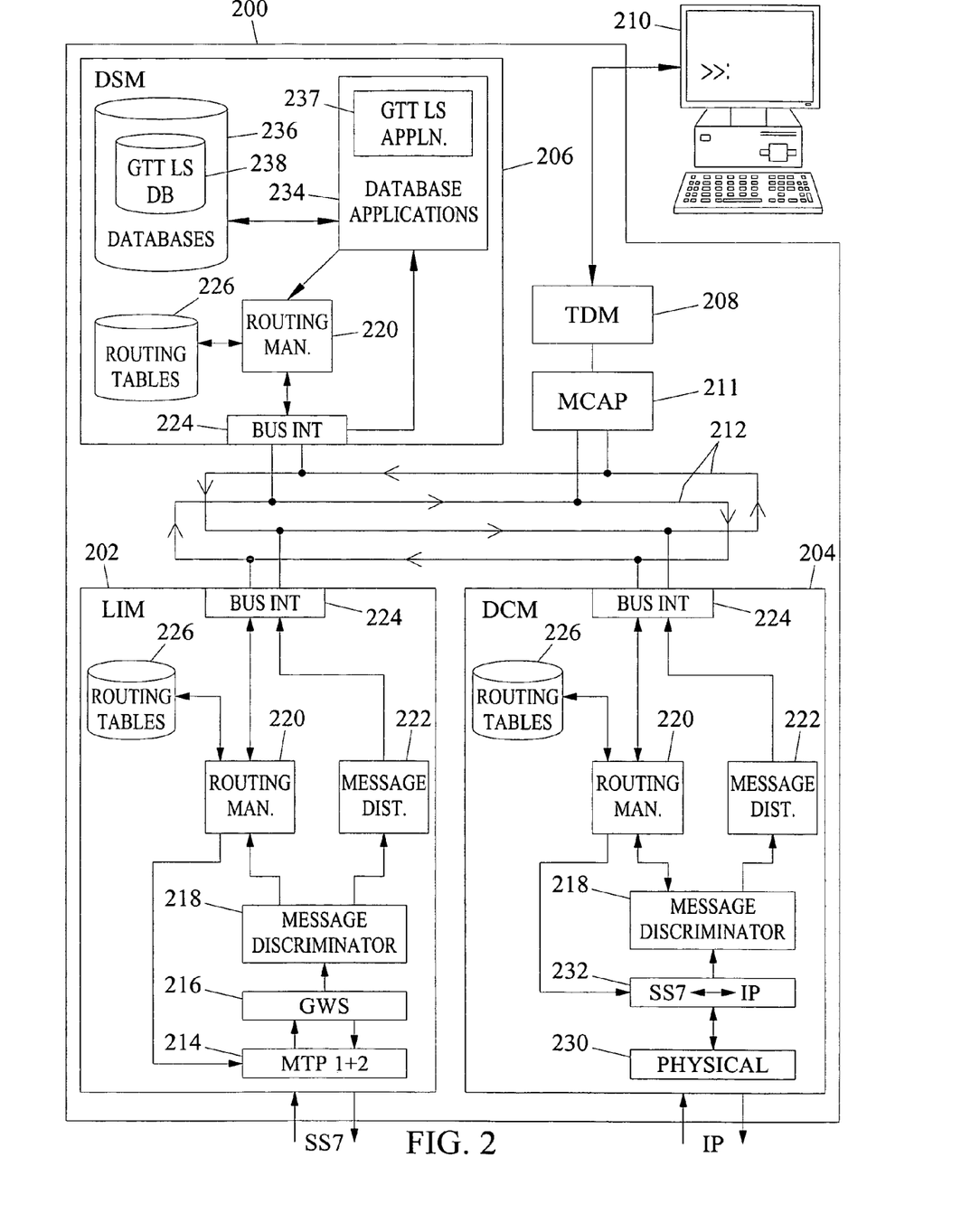
FIG. 2 is a block diagram illustrating a routing node capable of performing post-GTT load sharing according to an embodiment of the subject matter described herein.

The present invention includes methods, systems, and computer program products for load sharing global-title-routed messages in a manner that preserves sequencing of sequenced messages. FIG. 2 illustrates a routing node according to an embodiment of the present invention. In FIG. 2, routing node 200 includes a link interface module (LIM) 202 for interfacing with SS7 signaling links, a data communications module (DCM) 204 for interfacing with Internet protocol (IP) signaling links, a database services module (DSM) 206 for providing database services, such as local number portability (LNP) or global title translation (GTT), a terminal disk module 208 for interfacing with one or more external terminals 210, and a maintenance and administration subsystem communication application processor (MCAP) 211 for performing database provisioning and other maintenance related services. From a hardware perspective, modules 202, 204, 206, 208, 210, and 211 may each include a printed circuit board with one or more microprocessors mounted thereon. A counter-rotating, dual-ring bus 212 reliably connects the modules and processors illustrated in FIG. 2.

LIM 202 includes a plurality of sub-modules or processes that send and receive SS7 messages. The sub-modules or processes of LIM 202 may be implemented in hardware, software, firmware, or any combination thereof. In the illustrated example, LIM 202 includes a message transfer part (MTP) level 1 and 2 process 214. MTP level 1 and 2 process 214 performs MTP level 1 and 2 operations, such as receiving messages over a particular physical medium, performing error detection and error correction, and performing message sequencing. Gateway screening module 216 screens incoming messages based on destination point code values in the messages to determine whether the messages should be allowed into a service provider's network. Message discriminator 218 determines whether an incoming message is addressed to routing node 200 or should be through-switched. If message discriminator 218 determines that a message is to be through-switched, the message is passed to routing manager 220, which performs a lookup in routing tables 226 to select the linkset, link, and module or card for an outbound signaling message. If message discriminator 218 determines that a message is addressed to routing node 200, message discriminator 218 sends the message to message distributor 222 for distribution to one of the other processing modules within routing node 200. Message discrimination, distribution, and routing are typically referred to as MTP level 3 functions performed by LIM 202. A bus interface 224 controls the sending and receiving of messages via buses 212.

DCM 204, like LIM 202, includes a message discriminator 218, a routing manager 220, a message distributor 222, a bus interface 224, and routing tables 226. However, rather than having lower layer SS7 functions for interfacing with an SS7 network, DCM 204 includes a physical layer 230 and a bidirectional SS7/IP converter 232 for sending and receiving SS7 messages over an IP network. Physical layer 230 may include hardware and software for communicating over any suitable physical network capable of carrying IP packets, such as an Ethernet, fast Ethernet, or SONET. SS7/IP converter 232 preferably includes hardware and/or software for sending and receiving IP datagrams, extracting SS7 MSUs from IP datagrams, receiving SS7 MSUs, and encapsulating received SS7 MSUs in IP datagrams. Exemplary protocols that may be implemented by SS7/IP converter 232 include Tekelec's transport adapter layer interface (TALI) running over TCP or the Internet Engineering Task Force (IETF) signaling user adaptation layers (e.g., M3UA, SUA, or M2PA) running over the stream control transmission protocol (SCTP) or user datagram protocol (UDP).

DSM 206 performs database processing for messages that were addressed to routing node 200. Accordingly, DSM 206 includes database applications 234 and one or more databases 236. Database applications 234 may be any suitable database application for processing signaling messages, such as a GTT application. Database 236 stores data for access by database application 234. Once a received signaling message has been processed by database application 234, database application 234 forwards the message to routing manager 220 of database services module 206 for routing to the appropriate outbound signaling link. Like LIM 202 and DCM 204, DSM 206 includes routing tables 226 for selecting the outbound signaling linkset and link.

In the illustrated example, database application 234 includes a GTT load sharing application 237. Similarly, database 236 includes a GTT load sharing database 238. GTT load sharing application 237 performs lookups in GTT load sharing database 238 to determine the post-GTT destinations for a signaling message. If multiple post-GTT destinations are located, GTT load sharing application 238 may select among the post-GTT load sharing destinations using a predetermined parameter in the signaling message and a load sharing algorithm.

Unlike conventional global title translation tables, GTT load sharing database 238 may include multiple destination addresses for at least some of the global title addresses. Table 1 shown below illustrates exemplary entries that may be included in GTT load sharing database 238.

TABLE 1

GTT Load Sharing Database Entries

| GTA | PC/SSN |
|---|---|
| 9194605500 | 1-1-1/5 |
|  | 1-1-2/5 |
| 9194930000–9194939999 | 1-1-3/5 |
|  | 1-1-4/5 |

Referring to Table 1, the left-hand column represents the global title address and the right-hand column represents the point code and subsystem number combinations to which each global title address is translated. In Table 1, the first entry is a single global title address that translates into two different point code/subsystem number combinations. The second entry is a range of global title addresses that also translates into two different point code/subsystem number combinations. As discussed above, a predetermined parameter in a signaling message may be used to select among the post-GTT destinations. The predetermined parameter is preferably selected such that messages that are part of the same transaction are sent to the same destination. In one exemplary implementation, the predetermined parameter may be the TCAP transaction identifier. In another implementation, the predetermined parameter may be the SCCP called party address or the SCCP calling party address. The predetermined parameter may be any one or more parameters that uniquely identify a transaction. Examples of other parameters that may be used include the MTP SLS parameter and a segmentation parameter present in the optional part of extended unitdata/long unitdata XUDT/LUDT messages. The segmentation parameter indicates that there are additional segments of an XUDT/LUDT messages to be sent. For SIP messages, the optional parameter may be a SIP transaction identifier. Load sharing may be based on any parameter in any part of a signaling message that uniquely identifies a transaction of which the signaling message is a part. For example, any parameter of an SCCP payload that uniquely identifies a transaction of which the payload is a part may be used.

In order to perform load sharing using this parameter, a predetermined function, such as a modulus function, may be used to perform a mathematical operation using the predetermined parameter and select among the entries in GTT load sharing table 238. For example, the following algorithm may be utilized to select among multiple GTT database entries.

GTT_Dest_Selector=TCAP trans ID mod 2
If GTT_Dest_Selector==0, select first address
If GTT_Dest_Selector==1, select second address Using this algorithm, messages with odd transaction identifiers will be sent to one destination while messages with even transaction identifiers will be sent to the other GTT destination. Since messages that are part of the same transaction will result in the load sharing algorithm having the same value, messages will be load shared among post-GTT destinations on a per-transaction basis.

Sequencing of GTT messages may be preserved by any number of mechanisms. For example, in the architecture illustrated in FIG. 2, routing node 200 includes a single DSM card. As a result, messages received by DSM card 201 will be transmitted out in the same order in which they were received. Sequencing will be automatically preserved. In an implementation where multiple DSM cards are included, sequencing may be preserved by ensuring that messages requiring sequenced delivery are transmitted to the same DSM card while other messages are load shared among the multiple DSM cards. Such an implementation would require intelligence on the LIM and DCM cards to determine whether sequencing is required.

In yet another alternate implementation, messages requiring processing by a DSM card may be load shared among the multiple DSM cards. Messages requiring sequenced delivery may be returned to the originating LIM where they are assigned a time stamp and buffered for a predetermined time period. The time period may be set based on the maximum processing delay of a message requiring global title translation processing within routing node 200. If messages are mis-ordered due to being processed by different DSM cards, the messages will be reordered according to their time stamps at the originating LIM. The originating LIM then forwards the messages to the module associated with the appropriate outbound signaling link. This method for preserving sequencing and allowing load sharing among DSM cards within a routing node is described in commonly assigned, co-pending patent application Ser. No. 10/922,593, filed Aug. 20, 2004, the disclosure of which is incorporated herein by reference in its entirety.

Terminal disk module 208 includes hardware and/or software for terminal 210 to access databases and tables within routing node 200. Terminal disk module 208 may implement any suitable protocol for communicating with an external terminal, such as VT100. MCAP 211 includes one or more processors for implementing administration commands received by terminal 210. Such commands may include database provisioning commands and feature activation and modification commands.

Figure 3:
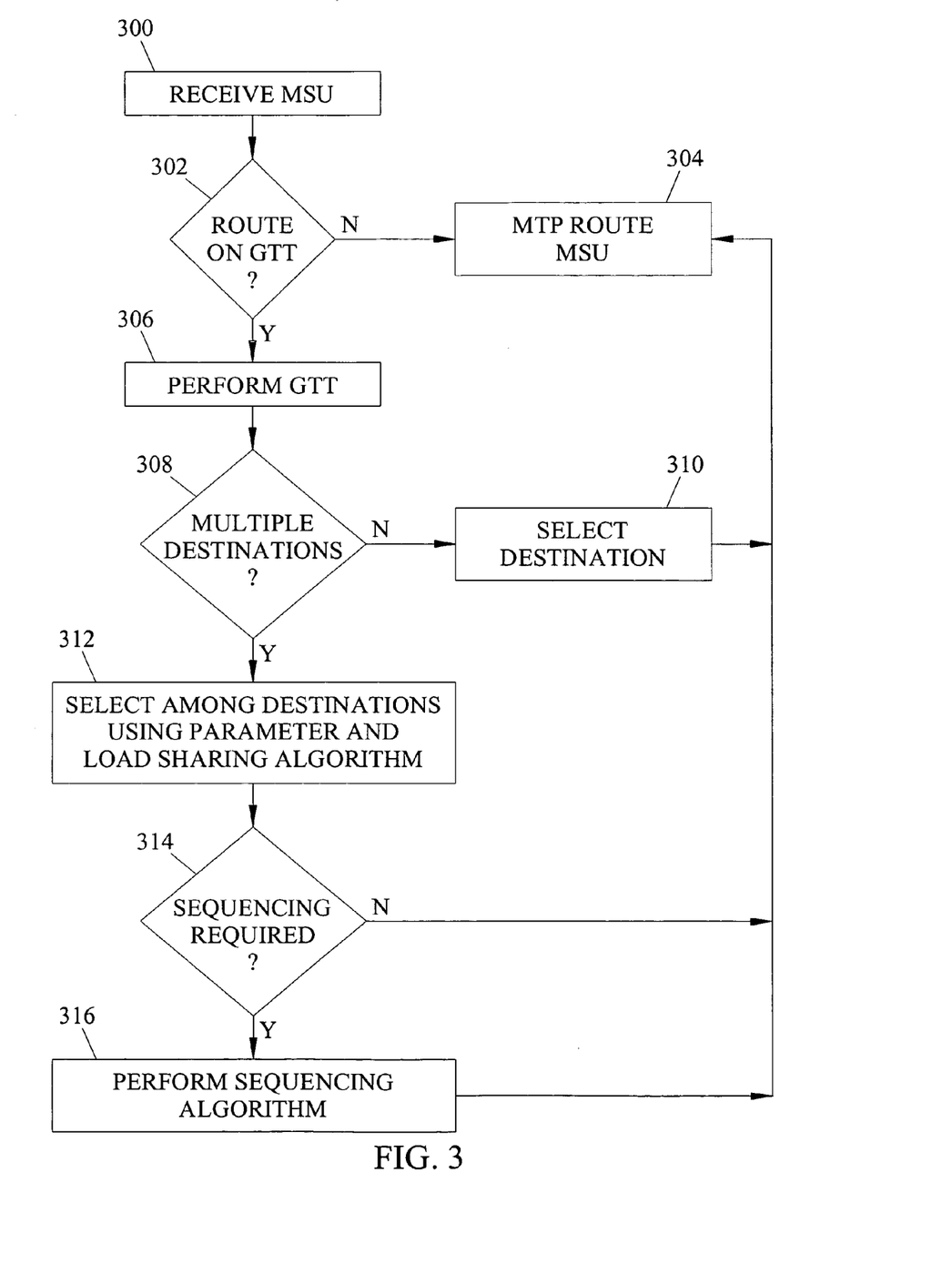
FIG. 3 is a flow chart of an exemplary load sharing and sequencing process according to an embodiment of the subject matter described herein.

FIG. 3 is a flow chart illustrating an exemplary post-GTT load sharing and sequencing process in accordance with the subject matter described herein. Referring to FIG. 3, in step 300, routing node 200 receives an MSU. The MSU may be received by link interface module 202 or data communications module 204. The message is passed up the MTP protocol stack to message discriminator 218. Message discriminator 218 determines whether the message is an SCCP message addressed to the point code or routing node 200. If the message is an SCCP message addressed to the point code of routing node 100, discrimination 218 may forward the message to distribution function 222, which forwards the message to DSM 206 for SCCP processing. If multiple DSM cards are present, the message may be sent to any one of the DSM cards based on a load sharing algorithm.

In step 302, the DSM card receives the message and determines whether the message is sent route-on-global-title. If the message is not sent route-on-global title, control proceeds to step 304 where the message is MTP routed to its destination. If the message is determined to be route-on-global-title, control proceeds to step 306 where global title translation is performed. This step may include forwarding the message to GTT load sharing application 237, which performs a lookup in global title translation load sharing database 238 based on the global title address extracted from the message. In step 308, global title translation load sharing application 237 determines whether multiple destinations exist for the global title address. If multiple destinations do not exist, control proceeds to step 310 where the single destination is selected and step 304 where the messages routed to its intended destination.

If multiple destinations do exist, control proceeds to step 312 where global title translation load sharing application 237 selects among the multiple destinations using a parameter extracted from the signaling message and a load sharing algorithm. As described above, the parameter is preferably selected so that messages relating to the same transaction result in selection of the same post-GTT destination. Exemplary parameters that may be utilized include the transaction identifier, the calling party address, or the called party address. The load sharing algorithm preferably operates to ensure that messages with different transaction identifiers are load shared among different signaling links. In one implementation, the function (mod2) may be used to select between two entries in the global title translation database.

In step 314 it is determined whether sequencing is required for the message. Determining whether sequencing is required may include examining the SCCP message class. If the message is determined to be class 1 SCCP message, sequencing may be required. If the message is a class 0 SCCP message, sequencing may not be required. If sequencing is not required, control returns to step 304 where the message is routed to its intended destination. If sequencing is determined to be required, control proceeds to step 316 where a sequencing algorithm is performed. The sequencing algorithm preferably ensures that messages that arrive at routing node 200 are transmitted in the same order in which they are received. Exemplary sequencing algorithms suitable for use with embodiments of the subject matter described herein are described in detail above and a description thereof will not be repeated herein.

Figure 4:
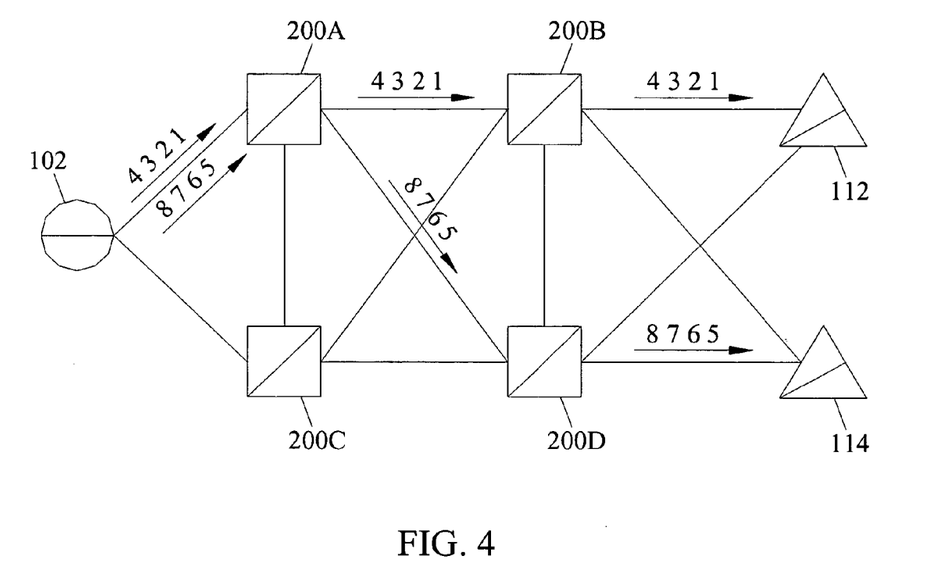
FIG. 4 is a message flow diagram illustrating exemplary sequencing and load sharing of SCCP messages according to an embodiment of the subject matter described herein.

FIG. 4 is a network diagram illustrating exemplary post-GTT load sharing according to an embodiment of the subject matter described herein. In FIG. 4, it is assumed that SSP 102 sends messages relating to two different transactions to STP 200A. The first group of messages contains messages numbered 1, 2, 3, and 4. The messages are assumed to be sent route-on-global-title. The second group of messages includes messages labeled 5, 6, 7, and 8. These messages are also assumed to be sent route-on-global-title. Because each group of messages relates to the same transaction, it is assumed that the messages have a transaction identifying parameter, such as a TCAP transaction ID.

When STP 200A receives the messages in the first transaction, it global title translates each message. In this example, it is assumed that the intermediate global title translation that returns both the point codes of STP 200B and STP 200D. In order to select among these point codes, STP 200A computes the transaction ID mod 2. The result of the computation is selection of point code corresponding to STP 200B.

For the messages that are part of the second transaction, STP 200A performs similar global title translation and uses the transaction identifier to select between the post-GTT point codes. Since the transaction identifier is assumed to be different from that of the messages relating to the first transaction, the result is selection of the point code corresponding to STP 200D. Thus, by using the transaction identifier, messages relating to the same transaction are delivered to the correct immediate global title translation destination.

At STPs 200B and 200D, final global title translations are performed. The final global title translation at each node results in the point codes of SCP 112 and SCP 114. Each STP uses the transaction identifier and the modulus function to select the appropriate point code for the transaction. Because messages relating the same transaction will result in selection of the same post-GTT address, the messages will be delivered to the appropriate destination. Sequencing of the messages may be preserved using the sequencing algorithm described above.

Thus, as illustrated above, the subject matter described herein provides methods, systems, and computer program products for post-GTT load sharing. One method includes performing GTT for messages received at a signal transfer point. If the global title translation database lookup results in multiple point codes, the point code that is inserted in the message may be selected based on applying a predetermined load sharing algorithm to a parameter extracted from the message. The parameter may be selected so that messages in the same transaction result in the same post-GTT destination. Sequencing may be applied to ensure that the messages are delivered in order.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for post-global title translation (GTT) load sharing, the method comprising:
   (a) receiving a plurality signaling messages sent route-on-global-title;
   (b) performing global title translation for the signaling messages, wherein performing global title translation includes locating a plurality of destination addresses for at least some of the signaling messages;
   (c) for each signaling message for which a plurality of destination addresses is located, selecting one of the destination addresses using a predetermined parameter in the signaling message and a load sharing algorithm such that messages relating to the same transaction select the same destination address and messages relating to different transactions are load shared among different destination addresses, wherein the load sharing algorithm includes a mathematical operation that uses the predetermined parameter to compute a value used to select the one destination address; and
   (d) routing each signaling message to the selected destination address.

2. The method of claim 1 wherein receiving a plurality of signaling messages sent route-on-global-title includes receiving a plurality of SS7 signaling messages sent route-on-global-title.

3. The method of claim 1 wherein receiving a plurality of signaling messages sent route-on-global-title includes receiving a plurality of SS7 user adaptation layer messages sent route-on-global-title.

4. The method of claim 1 wherein performing global title translation includes performing global title translation using a GTT load sharing table in which at least one global title address translates to a plurality of point codes.

5. The method of claim 4 wherein the global title translation load sharing table includes at least one entry that translates a range of global title addresses into a plurality of point codes.

6. The method of claim 4 wherein the global title translation load sharing table includes at least one entry that translates an individual global title address into a plurality of point codes.

7. The method of claim 4 wherein the global title translation load sharing table includes at least one entry that translates a range of global title addresses into a plurality of point codes and at least one entry that translates an individual global title address into a plurality of point codes.

8. The method of claim 1 wherein performing global title translation includes performing intermediate global title translation.

9. The method of claim 1 wherein performing global title translation includes performing final global title translation.

10. The method of claim 1 wherein the mathematical operation comprises a modulus operation.

11. The method of claim 1 wherein the predetermined parameter comprises a transaction identifier in a transaction capability application part (TCAP) portion of each of the signaling messages.

12. The method of claim 1 wherein the predetermined parameter includes the signaling connection control part (SCCP) called party address.

13. The method of claim 1 wherein the predetermined parameter includes the signaling connection control part (SCCP) calling party address.

14. The method of claim 1 wherein steps (a)–(d) are performed at a signal transfer point.

15. The method of claim 14 comprising determining whether the signaling messages require sequencing, and, in response to determining that the signaling messages require sequencing, applying a sequencing algorithm to ensure that the messages requiring sequencing exit the signal transfer point in the same order that the messages enter the signal transfer point.

16. The method of claim 1 wherein the signaling messages include extended unitdata (XUDT) and long unitdata (LUDT) messages and wherein the predetermined parameter includes a segmentation parameter located in an optional part of the XUDT and LUDT messages.

17. The method of claim 1 wherein the predetermined parameter includes a message transfer part (MTP) signaling link selection (SLS) parameter.

18. The method of claim 1 wherein the signaling messages include session initiation protocol (SIP) messages and wherein the predetermined parameter includes a SIP transaction identifier.

19. The method of claim 1 wherein the signaling messages include signaling connection control part (SCCP) messages and wherein the predetermined parameter comprises an SCCP payload parameter.

20. A routing node for performing post global title translation (GTT) load sharing of signaling messages, the routing node comprising:
  (e) a database services module for receiving a plurality of signaling messages sent route-on-global-title; and
  (f) a GTT load sharing application operatively associated with the database services module for global title translating each of the signaling messages to locate a plurality of destination addresses for at least some of the signaling messages and for selecting among the destination addresses using a predetermined parameter in the signaling messages and a load sharing algorithm such that the same destination address is selected for messages that are part of the same transaction, wherein the load sharing algorithm includes a mathematical operation that uses the predetermined parameter to compute a value used to select among the destination addresses.

21. The routing node of claim 20 comprising a global title translation load sharing table including at least one entry where a global title address maps to a plurality of destination addresses.

22. The routing node of claim 21 wherein the global title translation load sharing table includes at least one entry where a range of global title addresses map to a plurality of destination addresses.

23. The routing node of claim 21 wherein the global title translation load sharing table includes at least one entry where an individual global title address maps to a plurality of destination addresses.

24. The routing node of claim 21 wherein the global title translation load sharing table includes at least one entry where a range of global title addresses map to a plurality of destination addresses and at least one entry where an individual global title address map to a plurality of destination addresses.

25. The routing node of claim 21 wherein the GTT load sharing application is adapted to perform intermediate global title translation for at least some of the signaling messages and to load share the signaling messages between intermediate global title translation destinations.

26. The routing node of claim 20 wherein the GTT load sharing application is adapted to perform final global title translation for at least some of the signaling messages and to load share the signaling messages among final global title translation destinations.

27. The routing node of claim 20 wherein the mathematical operation comprises a modulus operation.

28. The routing node of claim 20 wherein the predetermined parameter in signaling messages used to select among the destination of addresses comprises a transaction capabilities application part (TCAP) transaction identifier.

29. The routing node of claim 20 wherein the predetermined parameter used to select among the destination addresses comprises the signaling connection control part (SCCP) called party address.

30. The routing node of claim 20 wherein the predetermined parameter used to select among the destination addresses comprises the signaling connection control part (SCCP) calling party address.

31. The routing node of claim 20 wherein the signaling messages comprise at least one of extended unitdata (XUDT) and long unitdata (LUDT) messages and wherein the predetermined parameter includes a segmentation parameter located in an optional part of the XUDT and LUDT messages.

32. The routing node of claim 20 wherein the predetermined parameter includes a message transfer part (MTP) signaling link selection (SLS) parameter.

33. The routing node of claim 20 wherein the signaling messages include session initiation protocol (SIP) messages and wherein the predetermined parameter includes a SIP transaction identifier.

34. The routing node of claim 20 wherein the signaling messages include signaling connection control part (SCCP) messages and wherein the predetermined parameter comprises an SCCP payload parameter.

35. The routing node of claim 20 wherein the database services module and the load sharing application are components of a signaling transfer point.

36. The routing node of claim 35 comprising a sequencing function operatively associated with the GTT load sharing application for determining whether the signaling messages require sequenced processing and, in response to determining that the signaling messages require sequenced processing, for transmitting the signaling messages to the destination address in the same order that they were received by the signaling transfer point.

37. The routing node of claim 20 wherein the GTT load sharing application is adapted to load share signaling messages after global title translation such that messages that are part of different transactions are load shared among different destinations.

38. A computer program product comprising computer-executable instructions embodied in a computer-readable medium for performing steps comprising:
  (g) receiving a plurality signaling messages sent route-on-global-title;
  (h) performing global title translation for the signaling messages, wherein performing global title translation includes locating a plurality of destination addresses for at least some of the signaling messages;
  (i) for each signaling message for which a plurality of destination addresses is located, selecting one of the destination addresses using a predetermined parameter in the signaling message and a load sharing algorithm such that messages relating to the same transaction select the same destination address and messages relating to different transactions are load shared among different destination addresses, wherein the load sharing algorithm includes a mathematical operation that uses the predetermined parameter to compute a value used to select the one destination address; and
  (j) routing each signaling message to the selected destination address.

39. The computer program product of claim 38 wherein receiving a plurality of signaling messages sent route-on-global-title includes receiving a plurality of SS7 signaling messages sent route-on-global-title.

40. The computer program product of claim 38 wherein receiving a plurality of signaling messages sent route-on-global-title includes receiving a plurality of SS7 user adaptation layer messages sent route-on-global-title.

41. The computer program product of claim 38 wherein performing global title translation includes performing global title translation using a GTT load sharing table in which at least one global title address translates to a plurality of point codes.

42. The computer program product of claim 41 wherein the global title translation load sharing table includes at least one entry that translates a range of global title addresses into a plurality of point codes.

43. The computer program product of claim 41 wherein the global title translation load sharing table includes at least one entry that translates an individual global title address into a plurality of point codes.

44. The computer program product of claim 41 wherein the global title translation load sharing table includes at least one entry that translates a range of global title addresses into a plurality of point codes and at least one entry that translates an individual global title address into a plurality of point codes.

45. The computer program product of claim 38 wherein performing global title translation includes performing intermediate global title translation.

46. The computer program product of claim 38 wherein performing global title translation includes performing final global title translation.

47. The computer program product of claim 38 wherein wherein the mathematical operation comprises a modulus operation.

48. The computer program product of claim 38 wherein the predetermined parameter comprises a transaction identifier in a transaction capabilities application part (TCAP) portion of each of the signaling messages.

49. The computer program product of claim 38 wherein the predetermined parameter includes the signaling connection control part (SCCP) called party address.

50. The computer program product of claim 38 wherein the predetermined parameter includes the signaling connection control part (SCCP) calling party address.

51. The computer program product of claim 38 wherein the signaling messages include at least one of extended unitdata (XUDT) and long unitdata (LUDT) messages and wherein the predetermined parameter includes a segmentation parameter located in an optional part of the XUDT and LUDT messages.

52. The computer program product of claim 38 wherein the predetermined parameter comprises a message transfer part (MTP) signaling link selection (SLS) parameter.

53. The computer program product of claim 38 wherein the signaling messages include session initiation protocol (SIP) messages and wherein the predetermined parameter includes a SIP transaction identifier.

54. The computer program product of claim 38 wherein the signaling messages include signaling connection control part (SCCP) messages and wherein the predetermined parameter comprises an SCCP payload parameter.

55. The computer program product of claim 38 wherein steps (a)–(d) are performed at a signal transfer point.

56. The computer program product of claim 55 comprising determining whether the signaling messages require sequencing, and, in response to determining that the signaling messages require sequencing, applying a sequencing algorithm to ensure that the messages requiring sequencing exit the signal transfer point in the same order that the messages entered the signal transfer point.

57. The method of claim 1 wherein receiving a plurality of signaling messages includes receiving a first group of signaling messages relating to a first transaction and traveling in a first direction and receiving a second group of signaling messages relating to a second transaction and traveling in the first direction, wherein performing global title translation includes locating the same set of point codes for the first and second groups of messages and wherein selecting one of the destination addresses includes selecting a first destination address for the first group of signaling messages based on a first parameter common to the first group of signaling messages and selecting a second destination address for the second group of signaling messages using a second parameter common to the second group of signaling messages, and wherein routing each signaling message to the selected destination address includes routing the first group of signaling messages to the first destination address and routing the second group of signaling messages to the second destination address.

58. The routing node of claim 20 wherein the GTT load sharing application is adapted to receive first and second groups of signaling messages respectively related to first and second transactions and traveling in a first direction, to perform global title translation to locate the same group of destination addresses for the first and second groups of signaling messages, and to select a first destination address for the signaling messages in the first group using a parameter common to the first group of signaling messages and a second destination address for the signaling messages in the second group using a parameter common to the signaling messages in the second group.

59. The computer program product of claim 38 wherein receiving a plurality of signaling messages includes receiving a first group of signaling messages relating to a first transaction and traveling in a first direction and receiving a second group of signaling messages relating to a second transaction and traveling in the first direction, wherein performing global title translation includes locating the same set of point codes for the first and second groups of messages and wherein selecting one of the destination addresses includes selecting a first destination address for the first group of signaling messages based on a first parameter common to the first group of signaling messages and selecting a second destination address for the second group of signaling messages using a second parameter common to the second group of signaling messages, and wherein routing each signaling message to the selected destination address includes routing the first group of signaling messages to the first destination address and routing the second group of signaling messages to the second destination address.

* * * * *